Aug. 8, 1961   S. NOVAK ET AL   2,995,148
POPPET VALVE AND MOUNTING
Filed May 29, 1959

INVENTOR.
STANLEY NOVAK
GEORGE L. GLAESER Jr.
BY
Elliott & Pastoriza
ATTORNEYS

United States Patent Office 2,995,148
Patented Aug. 8, 1961

2,995,148
POPPET VALVE AND MOUNTING
Stanley Novak, 302 Palm Drive, Hermosa Beach, Calif., and George L. Glaeser, Jr., 3125 Durang Ave., Culver City, Calif.
Filed May 29, 1959, Ser. No. 816,828
1 Claim. (Cl. 137—493.4)

This invention relates generally to pressure relief valves and more particularly to an improved miniature type poppet valve and mounting primarily for use with thin walled enclosures.

In certain enclosures such as electronic instrument casings and the like, it is desirable that the casing be substantially hermetically sealed to insure protection of the enclosed electrical components. The primary objective of sealed casings is to keep out dust and dirt and other foreign matter which may adversely affect the operation of the instrument. There are many instances, however, where environmental pressure changes can cause considerable damage to an hermetically sealed casing. For example, if the ambient pressure is considerably reduced, the entire casing can explode. On the other hand, increased environmental pressure may cause implosion.

While the foregoing difficulties can be overcome by simply designing a casing of sufficient structural rigidity to withstand such pressures, this solution increases the weight and bulk of the entire instrument and is, therefore, not particularly satisfactory, especially in airborne applications.

With the foregoing in mind, it is a primary object of the present invention to provide a poppet valve and mounting for attachment to instrument casings and the like which will automatically serve to reduce the pressure differential between the interior of the casing and the ambient pressure to a value within a tolerable range to the end that explosion and implosion effects can be entirely avoided.

Another important object is to provide an improved poppet valve of the foregoing type which will keep out any dirt and dust when in the closed position so that all of the advantages of hermetic sealing are still retained.

Another important object is to provide a novel mounting for the poppet valve which is simple, inexpensive, and insures a dust and dirt proof fitting.

Still another object is to provide a two-way type poppet valve in one valve body to the end that only a single unit need be provided for protection against both explosion and implosion.

Briefly, these and many other objects and advantages of the present invention are attained by providing a valve body having an interior portion incorporating a movable plunger. The interior opens out front and rear ends and the plunger is designed such that when in a first position, communication through the interior is blocked and in a second position communication is established. A compression spring surrounds the plunger and is arranged to bias the plunger to the first position so that the interior will normally be closed unless a predetermined pressure is exceeded adjacent the rear end of the valve body sufficient to move the plunger against the bias of the spring.

In the preferred embodiment incorporating a two-way poppet valve arrangement, the plunger itself is provided with a hollow interior opening out the front and rear end in turn incorporating an additional plunger and spring capable of movement between first and second positions to relieve pressure in an opposite direction. This additional plunger and spring are constructed in substantially the same form as the first mentioned plunger but mounted in an opposite sense to provide the desired two-way action.

A better understanding of the invention as well as further features and advantages thereof will be had by referring to the accompanying drawings in which.

Figure 1:
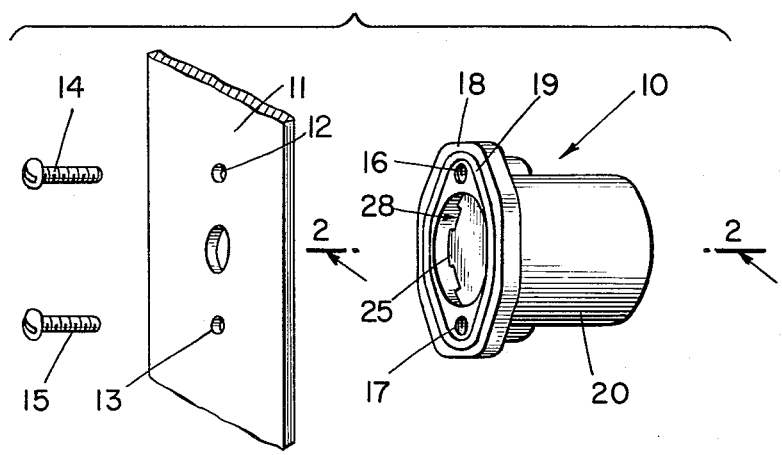
FIGURE 1 is an overall perspective view partly exploded illustrating a one-way poppet valve preparatory to mounting the same to the wall of an instrument casing.

Referring first to FIGURE 1, the poppet valve is designated generally by the numeral 10 in a position preparatory to mounting it to the side 11 of a thin walled structure, which may constitute a portion of an instrument casing. In the mounting of the poppet valve, there are provided two screw holes 12 and 13 in the wall for receiving mounting screws 14 and 15 from the exterior of the casing. The holes 12 and 13 are spaced for alignment with threaded sockets 16 and 17 in the front face of an enlarged mounting flange 18 on the front end of the valve 10. Also included on the front face 18 is an oval shaped annular groove receiving an O-ring sealing member 19. It will be noted that the sealing member 19 surrounds both of the threaded sockets 16 and 17 so that when the valve body designated 20 is mounted against the inside of the wall 11, complete sealing is insured particularly with respect to the mounting holes.

By the foregoing structure, special bosses, brackets, and the like are eliminated. Further, by making the oval type O-ring and corresponding receiving groove in the front mounting flange 18 relatively thick, the device may be readily mounted on irregular surfaces or even curved surfaces, the resilience and thickness of the O-ring accommodating such irregularity or non-planar portions.

Figure 2:
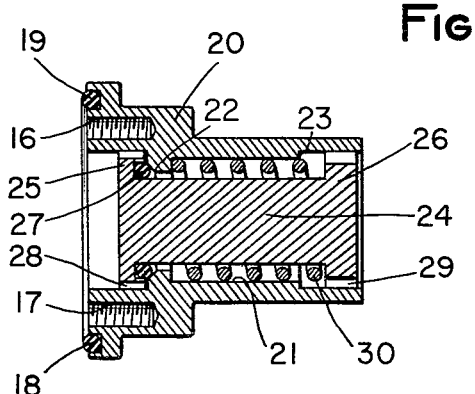
FIGURE 2 is a cross section of the valve body taken in the direction of the arrows 2—2 of FIGURE 1 showing the valve in closed position.
Figure 3:
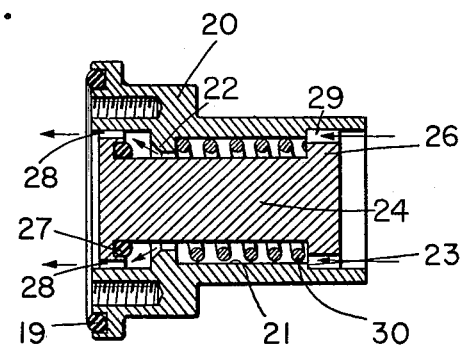
FIGURE 3 is a view similar to FIGURE 2 showing the valve in an open position to relieve pressure.

Referring now to FIGURES 2 and 3, the valve body 20 is shown in detail. The body itself is provided with a cylindrical interior 21 opening out front and rear ends. This interior includes a reduced diameter portion 22 defining an annular seating surface adjcent the front end. The rear end of the cylindrical interior 21 in turn includes an increased diameter section opening out the rear end and defining an annular shoulder 23.

A plunger member 24 is positioned within the cylindrical interior 21 and includes ends extending beyond the annular seating surface 22 and shoulder 23 and terminating respectively in an enlarged front end flange 25 and a rear end flange 26. The front end flange is provided on its rear surface with an annular sealing ring 27. Both the front and rear end flanges 25 and 26 are respectively provided with peripheral grooves 28 and 29 running parallel to the axis of the plunger. One of the grooves 28, for example, is shown in the perspective view of FIGURE 1 for the front end flange 25. The radially projecting portions of the front and rear flanges defining these grooves ride on the front and rear interior cylindrical surfaces of the interior of the valve body and thus hold the plunger in axial alignment. Further, these portions will abut the reduced diameter seating surface and shoulder of the interior of the valve body respectively upon back and forth movement of the plunger and thus serve as stops.

As shown in FIGURE 2, there is provided a coiled compression spring 30 surrounding the plunger 24 between the reduced diameter portion of the cylindrical interior valve body and the rear end flange 26. By this arrangement, the plunger 24 is biased rearwardly or to the right to seat the annular sealing ring 26 on the annular seating surface 22. Thus, in the position shown in FIGURE 2, communication between the rear and front ends of the interior of the valve body is blocked unless the pressure at the rear end of the body exceeds the force exerted by the spring.

FIGURE 3 illustrates a second position of the plunger 24 as a consequence of the pressure within the instrument casing, for example, exceeding the ambient pressure by a predetermined amount. As shown in the position of FIGURE 3, pressure is relieved through the rear grooves 29 and the interior cylindrical section of the valve body and out past the sealing ring 26 and front grooves 28. When a predetermined safe pressure differential is established, the spring 30 will return the plunger 24 to the position illustrated in FIGURE 2.

By providing another poppet valve structure similar to that described in connection with FIGURES 2 and 3, but having the flange mounting on the other end, differential pressure may be relieved in both directions.

Figure 4:
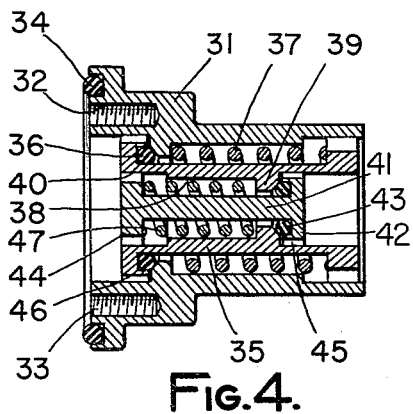
FIGURE 4 is a cross sectional view of a two-way poppet valve in accordance with the invention showing the various interior passages in closed position; and, FIGURE 5 is a view similar to FIGURE 4 illustrating the corresponding interior passages in open position for two-way relief action.
Figure 5:
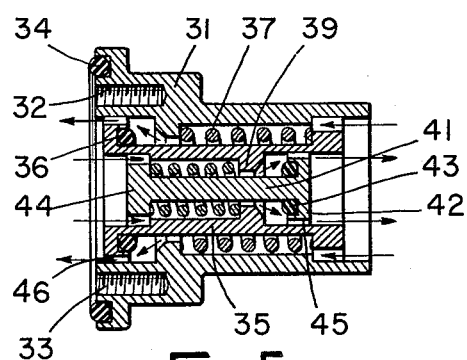

Rather than provide two separate valves, however, it is possible in accordance with the present invention to incorporate a two-way poppet valve in one structure. Referring to FIGURES 4 and 5, for example, such a two-way valve is shown as comprising a main valve body 31 provided with threaded openings 32 and 33 together with a surrounding sealing member 34 to provide a mounting structure similar to that for the valve described in connection with FIGURE 1.

As shown in FIGURE 4, the valve body 31 includes a cylindrical interior portion housing a plunger 35 having suitable end flanges together with a sealing member 36 arranged to seat against a reduced diameter portion in the interior of the valve body. A spring 37 is arranged to bias the plunger 35 and the action is precisely the same as that described in connection with FIGURES 2 and 3.

The plunger 35 in the embodiment shown in FIGURES 4 and 5, is itself, however, provided with a cylindrical interior portion 38 having open ends and including a reduced diameter portion 39 defining a seating surface adjacent the right hand end of the plunger 35, and an increased diameter section 40 opening out the other end. Within this interior of the plunger, there is provided an additional plunger 41 provided with a front end flange 42 and annular sealing ring 43 and a rear end flange 44. This additional plunger also includes grooves 45 and 46 in its enlarged flanged ends respectively for guiding movement of the plunger within the interior of the first mentioned plunger 35. A compression spring 47 in turn is positioned to surround the additional plunger 41 and exert pressure between the reduced diameter portion 39 and rear end flange 44 as shown. By this arrangement, the additional plunger 41 is biased to the left so that the sealing ring 43 seats on the annular seat defined by the reduced diameter portion 39.

It will be evident from the above description that the additional plunger 41, spring 47, and other structural portions of the device are substantially identical in operation to the first mentioned plunger 35 and valve body 31 except that the additional plunger is disposed for action in an opposite sense. Thus, referring to FIGURE 5 the relative positions of the various plungers is illustrated for passing air in either direction. When the pressure within the casing wall to which the double action poppet valve is attached exceeds the environmental pressure, the main plunger 35 will be moved forwardly to the position illustrated in FIGURE 5 so that air may pass through the various grooves in the end flanges as indicated by the arrows. On the other hand, when the environmental pressure exceeds the pressure within the casing, the main plunger 35 will remain seated in the position shown in FIGURE 4 and the additional plunger 41 will be forced to the right to pass environmental air into the casing as also indicated by the arrows.

While the above described actions are shown in FIGURE 5 as occurring simultaneously, it will be understood, of course, that only one or the other situations obtains at any one time depending upon the direction of the pressure differential.

From the foregoing description, it will be seen that the present invention provides a greatly improved poppet valve structure. By incorporating springs to provide a sufficient biasing force to prevent movement of the valve until a predetermined pressure differential exists, the valves will remain closed for appreciable periods to seal the casing from dirt and dust. The "cracking point" to which the valves may be adjusted will, of course, be determined by the strength of the casing and a desired safety margin.

Various changes and modifications that fall clearly within the scope of the invention will occur to those skilled in the art. For example, while the sealing rings have been identified for convenience as "oval-shaped O-rings" they could clearly be "quad-rings" or other polygonal shaped structures to surround the mounting holes and in the foregoing specification and following claim, the words "oval-shaped" and "O-rings" are meant to include such other shapes. The poppet structures are, therefore, not to be thought of as limited to the particular embodiments set forth for illustrative purposes.

What is claimed is:

A poppet valve comprising: a valve body having a cylindrical interior with open front and rear ends, said interior including a reduced diameter portion defining adjacent its front end an annular seating surface, and an increased diameter section opening out its rear end to define an annular shoulder; a plunger positioned within said cylindrical interior, said plunger having front and rear ends extending beyond said seating surface and said shoulder respectively and terminating in enlarged annular front and rear flange members respectively, each having peripheral grooves running parallel to the axis of said plunger, said front flange member including a sealing ring on its rear surface positioned to seat on said annular seating surface when said plunger is in a rear position to close said valve; a coiled compression spring surrounding said plunger between said reduced diameter portion of said valve body and said rear flange member urging said plunger rearwardly to hold said sealing ring against said seating surface in the absence of a pressure exceeding a predetermined pressure acting on the rear end of said plunger, said plunger being provided with a cylindrical interior having open front and rear ends positioned oppositely to said first mentioned front and rear ends of the cylindrical interior of said valve body; and an additional plunger and additional compression spring within said cylindrical interior of said first mentioned plunger, said cylindrical interior of said first mentioned plunger, said additional plunger, and said additional compression spring being constructed similarly respectively to the cylindrical interior of said valve body, said first mentioned plunger, and said first mentioned compression spring, but positioned in an opposite sense to provide an overall two way poppet valve.

References Cited in the file of this patent

UNITED STATES PATENTS

| | | |
|---|---|---|
| 973,440 | Kessler | Oct. 18, 1910 |
| 1,229,885 | Chadwick | June 12, 1917 |
| 1,242,839 | Mulderig | Oct. 9, 1917 |
| 2,072,271 | Meadows | Mar. 2, 1937 |
| 2,138,000 | Ehlers | June 9, 1938 |
| 2,393,589 | Compton et al. | Jan. 29, 1946 |
| 2,550,138 | Crawford | Apr. 24, 1951 |
| 2,592,547 | Dunn | Apr. 5, 1952 |
| 2,596,982 | Chisholm | May 20, 1952 |
| 2,612,408 | Kurata | Sept. 30, 1952 |